J. E. WALLACE.
BAKING PAN ATTACHMENT.
APPLICATION FILED AUG. 12, 1911.

1,063,144.

Patented May 27, 1913.

Inventor
James E. Wallace

Witnesses

By Victor J. Evans
Attorney

UNITED STATES PATENT OFFICE.

JAMES E. WALLACE, OF PADUCAH, KENTUCKY.

BAKING-PAN ATTACHMENT.

1,063,144.  Specification of Letters Patent.  Patented May 27, 1913.

Application filed August 12, 1911. Serial No. 643,741.

*To all whom it may concern:*

Be it known that I, JAMES E. WALLACE, a citizen of the United States, residing at Paducah, in the county of McCracken and State of Kentucky, have invented new and useful Improvements in Baking-Pan Attachments, of which the following is a specification.

This invention relates to a combined layer cake and biscuit pan, and has for an object to provide a device of this character which will greatly facilitate the baking of a complete number of layers necessary to the making of a many-layer cake, the device including a pan and a series of substantially ring members, the latter fitting in the former and extending above the same so that the outer walls of the ring will be effectively exposed to the heat so that the layers will be uniformly baked and browned.

Another object of the invention is to provide a device wherein the rings above mentioned can be readily removed from the pan or tray so that the latter can be used for baking biscuits, rolls, etc.

Figure 1:
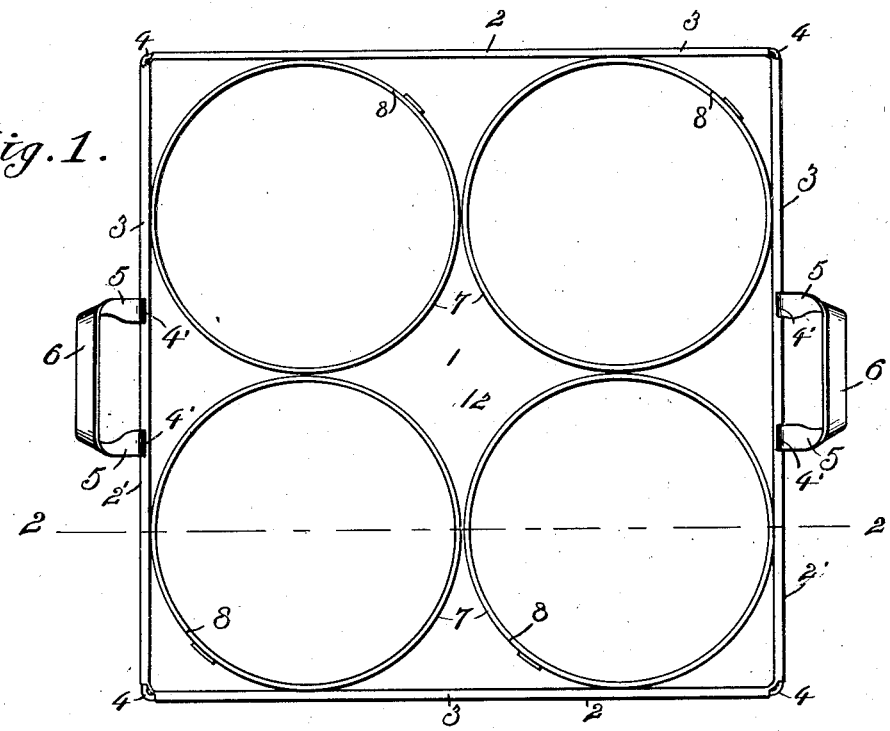
Figure 2:
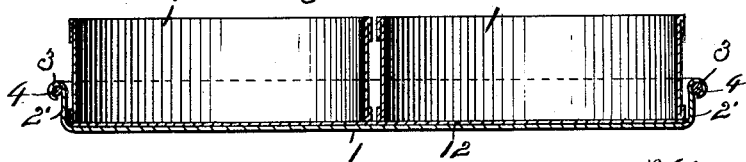
Figure 4:
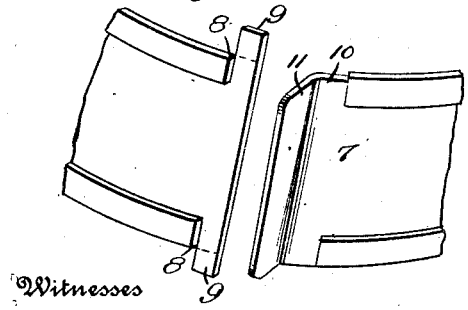
Figure 3:
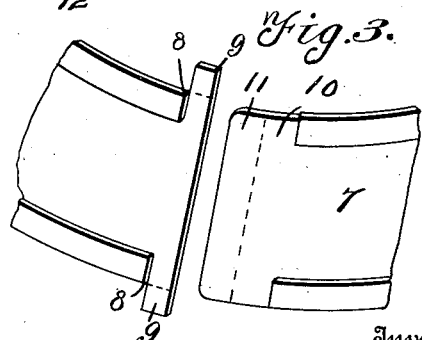

In the drawing, forming a portion of this specification and in which like numerals of reference indicate similar parts in the several views: Figure 1 is a plan view of the device. Fig. 2 is a longitudinal section therethrough on the line of 2—2 of Fig. 1. Fig. 3 is a perspective view of a portion of one of the rings showing the interfitting ends thereof, the said interfitting ends being separated from each other. Fig. 4 is a view similar to Fig. 3, showing the interfitting ends with the tongue bent out radially.

My improved pan comprises preferably a shallow tray or pan member 1 formed of a single piece of metal which is stamped to provide relatively short walls 2. The walls are curled outwardly at their upper edges, at 3, receiving in such curled portions a reinforcing wire 4. A pair of walls 2 are provided with suitable slots 4 through which the side portions 5 of the lifting handles 6 extend, the said portions 5 of the handles being looped about the reinforcing wire so that the handles are free for pivotal movements.

The device as constructed herein is designed principally for the baking of four cake layers, and in view thereof, the rectangular pan or tray 1 has mounted therein four substantially relatively deep rings 7. Each ring is formed of a single length of suitable metal, and as shown, the metal has its upper and lower portions each bent upon itself so as to reinforce the ring, the said bent portions of the ring at one end of the latter are slit, at 8, so as to present retaining tongues 9 beneath which the extension 10 at the opposite end of the ring is adapted to fit, the end of the extension being bent, at 11, onto the tongues 9 so as to hold the ends of the ring securely connected with each other.

From the construction described it will be seen that the major portion of each ring will be exposed to the full action of the heat so that the cake layer will be thoroughly cooked and browned. When using the pan for cake baking, a sheet of paper 12 conforming in configuration with the pan 1 is placed on the bottom of the pan, after which, the interior surfaces of the rings are thoroughly greased and then placed upon the paper. The dough is then poured in the ring as will be understood. If desired the rings may be removed from the pan and the latter used for baking biscuits, rolls or the like.

I claim:

A baking pan attachment comprising, a ring constructed of a single piece of metal and provided along its upper and lower edges with reinforcing flanges, one terminal of the metal being extended beyond the adjacent ends of the flanges thereof to provide a tongue, the flanges at the opposite terminal of the metal being slit vertically whereby to receive the tongue, the said flanges of said other terminal having portions bent into engagement with the tongue, and the said tongue being bent into engagement with the exterior surfaces of said portions.

In testimony whereof I affix my signature in presence of two witnesses.

JAMES E. WALLACE.

Witnesses:
SIDNEY W. SOUERS,
L. D. SANDERS.